UNITED STATES PATENT OFFICE.

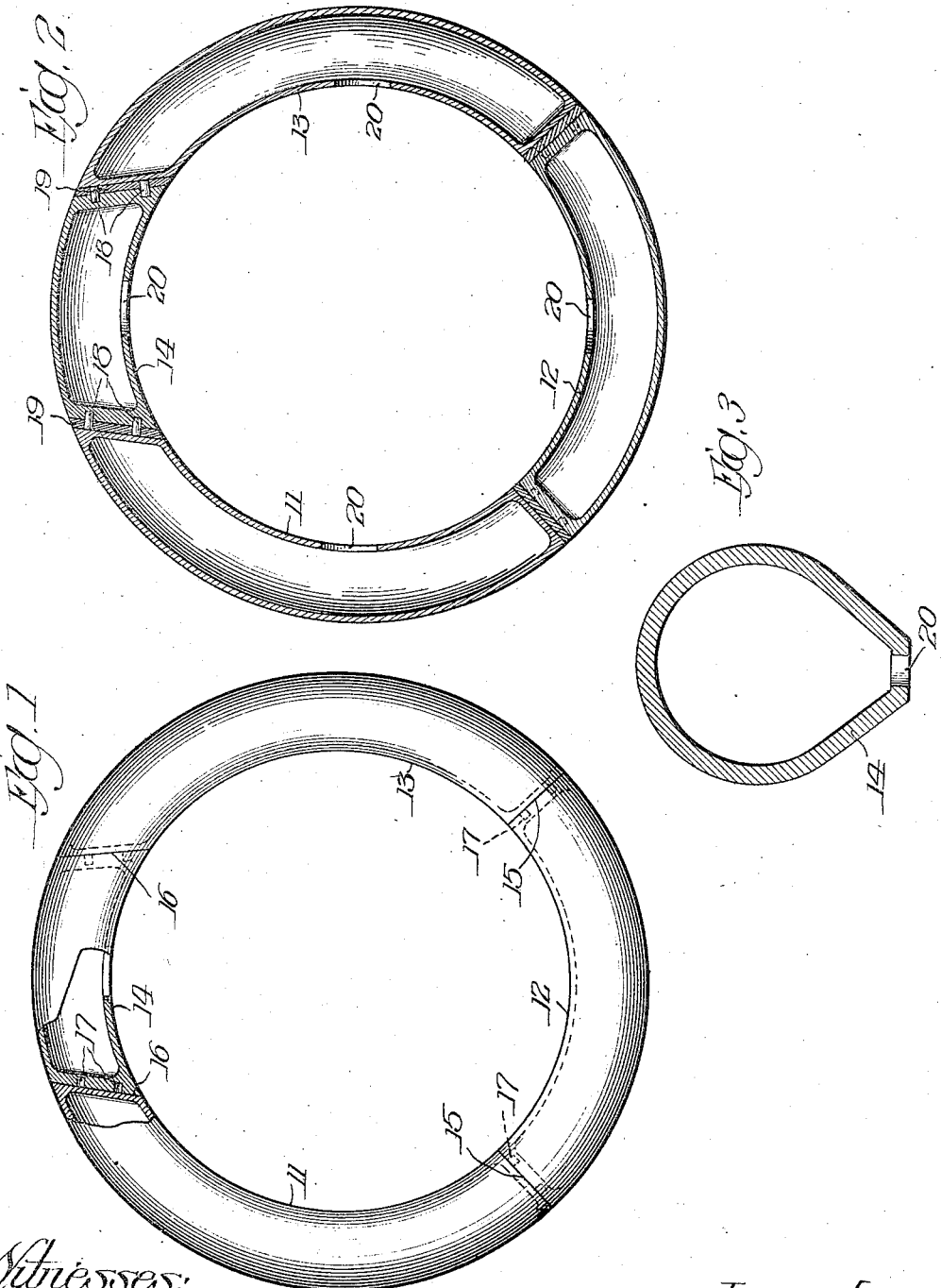

LEMON GREENWALD, OF AKRON, OHIO, ASSIGNOR TO THE FIRESTONE TIRE & RUBBER COMPANY, OF AKRON, OHIO, A CORPORATION OF OHIO.

EXPANSIBLE COLLAPSIBLE TIRE-CORE.

1,106,506.	Specification of Letters Patent.	Patented Aug. 11, 1914.

Application filed April 18, 1913. Serial No. 761,920.

*To all whom it may concern:*

Be it known that I, LEMON GREENWALD, a citizen of the United States, residing at Akron, in the county of Summit and State of Ohio, have invented certain new and useful Improvements in Expansible Collapsible Tire-Cores, of which the following is a specification.

In the curing of pneumatic tire shoes or cases during the process of manufacture, the case is supported upon an inner core which holds the same distended and in proper shape; also in the repair and particularly the vulcanization of tire cases which have become injured in use, the employment of a core is necessary to hold the tire firmly during treatment. Inflatable air bags have been used in this connection as also have wire coils, but the former practice is open to the objection that the bags are subject to leakage and consequent loss of firmness, and also that the bags intervene to shield the inner fabric of the case from the vulcanizing heat, while the use of wire coils is objectionable, both because the material of the case is not supported immediately over the spaces between the wires and also because the wire coil permits the steam to come into direct contact with and injure the inner fabric of the case. I avoid all these objections and provide a firm, light, collapsible core which supports the case uniformly throughout and protects the fabric from the moisture of the steam while not interfering with the application of the heat thereto.

My improved collapsible core also provides for variations in size whereby to adapt the one core to all tire cases of a general exterior size but of different types, the regular clencher tire being of smaller interior dimensions than the quick-detachable clencher and the straight side types of tires. This adaptability is attained by the employment in connection with the core sections of shims or distance plates interposed between the adjacent ends of such sections.

In order that the invention may be readily understood, a preferred embodiment of the same is set forth in the accompanying drawing and in the detailed description predicated thereon. As the invention is, however, capable of embodiment in other and varied constructional forms, the drawing and description are to be taken in an illustrative and not in an unnecessarily limiting sense.

In the drawing, Figure 1 is a side elevation of the core assembled, with certain parts broken away to show the interior construction; Fig. 2 is a central median section through the assembled core; and Fig. 3 is a transverse section through one of the core elements.

Having reference to the several figures of the drawing, the core is shown as composed of four sections or segments 11, 12, 13 and 14 which are complementary one to another. Obviously the number may be increased or diminished to a minimum of three without affecting the invention. The segments 11 and 13 are advantageously separated from the interposed segment 12 upon radial division line 15, 15, while they are separated from interposed segment 14 upon non-parallel inwardly diverging division lines 16, 16, such that the arc forming the inner wall of the segment 14 is but slightly greater than the arc forming the outer wall of said segment and, preferably, to the extent of about 1½ inches. This enables the assembling of the collapsible core within the tire casing by inserting the three segments 11, 12 and 13 in proper relation and then finally slipping the segment 14 into the casing between the segments 11 and 13 in a radial direction, while the other segments are wedged apart to completely fill the casing.

In order to adapt the sectional core for use in connection with tire casings of a type having a slightly greater interior dimension, I provide the end faces of the two segments 12 and 14 with recesses or sockets 17, 17 which are without function when the core is assembled for use in the smaller type of casings indicated in Fig. 1, but which recesses are adapted to receive dowel pins 18, 18 of shims or distance plates 19, whereby the effective length of each of the segments 12 and 14 is increased for assembling for use in connection with tires of the larger type as indicated in Fig. 2.

Each of the segments is preferably formed of metal such as aluminum by casting in hollow form as indicated, with as thin walls as is consistent with the proper degree of strength and resistance to deformation. Each of the segments is likewise provided in its inner wall with an opening 20, which places the interior of the hollow segment in open connection with the atmosphere, which provision enables the steam to enter the segments and to subject the interior of the tire casing to substantially the same degree of heat as the exterior thereof, while at the same time protecting the interior fabric against injury from direct contact with the moisture of the steam.

I claim:

1. A collapsible tire core composed of segments, distance plates interposed between the adjacent end faces of the segments, and means to hold the distance plates in proper assembled relation to certain of the segments.

2. A collapsible tire core composed of segments, and distance plates interposed between the adjacent end faces of the segments, the distance plates and segments provided with interengaging members.

3. A collapsible tire core composed of segments, and distance plates interposed between the adjacent end faces of the segments, the distance plates having pin and socket engagement with certain of the segments.

4. A collapsible tire core composed of segments, and distance plates interposed between the adjacent end faces of the segments, the distance plates provided with pins and certain of the segments with recesses for the reception of the pins.

5. A collapsible tire core composed of hollow segments, the several segments having openings communicating between the interior and the atmosphere, and distance plates interposed between the adjacent end faces of the segments, the distance plates and segments provided with interengaging members.

6. A collapsible tire core composed of hollow segments, the several segments having openings communicating between the interior and the atmosphere, and distance plates interposed between the adjacent end faces of the segments, the distance plates having pin and socket engagement with certain of the segments.

7. A collapsible tire core composed of hollow segments, the several segments having openings communicating between the interior and the atmosphere, and distance plates interposed between the adjacent end faces of the segments, the distance plates provided with pins and certain of the segments with recesses for the reception of the pins.

8. An expansible and contractible collapsible tire core composed of several detachable segments and distance pieces removably interposed between adjacent ends of said segments permitting the sides of the core to be varied, the distance plates and segments provided with interengaging members.

In witness whereof I have hereunto set my hand in the presence of two witnesses.

LEMON GREENWALD.

Witnesses:
S. G. CARSCHUFF,
E. M. HAHN.